US006959600B2

(12) United States Patent
Lonsdale et al.

(10) Patent No.: US 6,959,600 B2
(45) Date of Patent: Nov. 1, 2005

(54) VIBRATORY GYROSCOPE

(75) Inventors: Anthony Lonsdale, Banbury (GB); Bryan Lonsdale, Banbury (GB)

(73) Assignee: Transense Techologies PLC (GB)

( * ) Notice: Subject to any disclaimer, the term of this patent is extended or adjusted under 35 U.S.C. 154(b) by 0 days.

(21) Appl. No.: 10/489,395

(22) PCT Filed: Sep. 11, 2002

(86) PCT No.: PCT/GB02/04136

§ 371 (c)(1), (2), (4) Date: Sep. 7, 2004

(87) PCT Pub. No.: WO03/023324

PCT Pub. Date: Mar. 20, 2003

(65) Prior Publication Data

US 2005/0028591 A1 Feb. 10, 2005

(30) Foreign Application Priority Data

Sep. 11, 2001 (GB) .............................................. 0122011

(51) Int. Cl.$^7$ .............................................. G01C 19/00
(52) U.S. Cl. .................................................. 73/504.13
(58) Field of Search ........................ 73/504.04, 504.13, 73/504.02, 504.03, 504.12

(56) References Cited

U.S. PATENT DOCUMENTS

| 3,352,162 A | | 11/1967 | Hart |
| 3,924,475 A | * | 12/1975 | Stiles ......................... 74/5.6 A |
| 4,384,409 A | | 5/1983 | Lao |
| 4,951,508 A | | 8/1990 | Loper, Jr. et al. |
| 5,044,749 A | | 9/1991 | Califano |
| 6,240,781 B1 | * | 6/2001 | Namerikawa et al. ... 73/504.13 |

FOREIGN PATENT DOCUMENTS

| EP | 0 729 010 A1 | | 8/1996 |
| JP | 3-156313 | * | 7/1991 |
| JP | 3-170015 | * | 7/1991 |
| JP | 10-185582 | | 7/1998 |
| JP | 11-14365 | * | 1/1999 |
| JP | 2001-108442 | | 4/2001 |
| WO | WO 91/13832 | * | 9/1991 |
| WO | WO 97/12204 | | 4/1997 |

* cited by examiner

*Primary Examiner*—Helen Kwok
(74) *Attorney, Agent, or Firm*—Keusey, Tutunjian & Bitetto, P.C.

(57) ABSTRACT

A vibratory gyroscope is provided that includes a vibratory element; a vibration inducing device for inducing a mode of vibration into the vibratory element; and a processing device for generating, in response to a change in strain detected in the vibratory element, a signal indicative of a rate of rotation about an axis of the vibratory element corresponding to a rotation imparted to the vibratory element subsequent to an inducing of the vibration. The vibration inducing device includes an acoustic signal source provided at a location spaced from the vibratory element. Undesirable effects associated with mounting the vibration inducing device to the vibratory element are thereby avoided.

14 Claims, 4 Drawing Sheets

VIBRATORY GYROSCOPE

TECHNICAL FIELD OF THE INVENTION

The present invention relates to vibratory gyroscopes and particularly, but not exclusively, to surface acoustic wave gyroscopes having a cylindrical form.

DESCRIPTION OF RELATED ART

A basic prior art cylinder vibratory gyroscope 2 is shown in FIGS. 1 to 3. The gyroscope 2 comprises a uniform cylinder 4, generally of a metallic or ceramic material, which is closed at one end 6 and mounted on a pedestal 8 so that the other end 10 of the cylinder 4 is free to vibrate. An arrangement of transducers A, A', B, B', C, C', D, D' are positioned around the circumference of the cylinder free end 10 and may be driven at one of the flexural resonance frequencies of the cylinder 4 so as to induce flexural vibration in the wall of the cylinder 4. The transducers A to D'are illustrated as piezoelectric devices mounted on the cylinder 4 itself and each have a connecting wire 12 attached thereto which extends through the pedestal 8 to appropriate control circuitry schematically shown in FIG. 3.

As shown in FIGS. 2 and 3, the cylinder 4 is generally driven so as to adopt its fundamental mode of flexural vibration for which there are two complete wavelengths of flexural vibration around the cylinder circumference. It will be understood that such a vibration comprises a standing wave having four nodes 14, 16, 18, 20 located symmetrically about the cylinder circumference with antinodes 22, 24, 26, 28 located therebetween. The cylinder is preferably manufactured to be as perfectly symmetrical as possible so that vibration at the same frequency occurs for any orientation of standing wave relative to the cylinder circumference.

A flexural vibration is generated by means of a driving force applied at the resonance frequency to one pair of transducers A, A' located on opposite sides of the cylinder 4 (see FIG. 3 in particular). It will be seen that the flexural vibration has antinodes 24, 28 at the two drive positions. A feedback circuit incorporating a phaselocked loop is used so as to stabilize and maintain the drive signal frequency at the flexural resonance frequency of the cylinder. The feedback circuit operates by monitoring displacement of the cylinder wall by means of a second pair of transducers B, B' and using the output from these transducers to maintain a π/2 phase difference between the displacement and the driving voltage. In this way, the drive signal may be maintained at the resonance frequency.

Whilst the cylinder 4 remains stationary about its longitudinal axis 30, the orientation of the standing wave 32 (see FIGS. 2 and 3) remains stationary and the positions of nodes 14 to 20 and antinodes 22 to 28 remain fixed along the cylinder circumference. However, when the cylinder 4 is rotated about its axis 30, the standing wave 32 does not remain stationary with respect to the cylinder 4. As a consequence, the positions of the nodes 14 to 20 and antinodes 22 to 28 move along the cylinder surface. As will be understood by those skilled in the art, sensing the angular movement of the standing wave allows the angular motion of the cylinder to be determined and enables the apparatus to be used as a gyroscope.

A qualitative explanation for the angular movement of the standing wave 32 can be given by consideration of the Coriolis forces acting on the cylinder 4 as it rotates. With reference to a particular point a on the circumference of the cylinder 4 (see FIG. 2), it will be seen that, if the cylinder rotates about its axis 30 at a constant angular velocity Ω, then a Coriolis force $F_c$ is generated at this point a in a direction tangential to the cylinder circumference. Likewise, upon the opposite side of the cylinder 4 at point a', an equal Coriolis force $F_c$, is generated in a tangential but opposite direction. The direction in which each Coriolis force $F_c$ acts is dependent upon the direction of radial movement of the points a and a' as indicated by arrows 36. It can be seen that the two Coriolis forces produce a couple about the cylinder axis 30 and contribute to the angular offsetting of the standing wave 32.

Similarly, at intermediate points b and b' the velocity of the cylinder wall has a radial component equal and opposite to that at points a and a' (the direction of which is indicated by arrows 38). As a consequence, the Coriolis forces $F_c$ at points b and b' are equal and opposite to those at points a and a' and generate an oppositely acting couple.

The addition of the two couples produces a component of force acting on the cylinder in a radial direction at an angle of 45° to the direction of the driving force. This resultant Coriolis force is indicated in FIG. 2 by arrows 34.

As a consequence of the resultant Coriolis force, a component of flexural vibration is generated in the cylinder 4 at an angle of 45° to the original vibration. This component has a magnitude proportional to the rate of angular rotation of the cylinder 4. It is the vector addition of this rotation-induced component vibration with the original vibration that produces the aforementioned small angular offset of the standing wave and the accompanying displacement of the nodes 14 to 20 on the cylinder circumference.

In order to obtain an angular rate output corresponding to the rate of cylinder rotation, it is convenient to place transducers C, C' at nodal points 14, 18 on the cylinder circumference so as to measure the radial component of vibration. Of course, whilst the cylinder is stationary, the radial component of vibration at all nodal points is zero. Accordingly, the transducers C, C' located at nodal points 14, 18 will not generate any output whilst the cylinder remains stationary. However, once the cylinder is rotated, the nodal points 14, 18 are displaced along the cylinder circumference as a consequence of Coriolis forces and the transducer C, C' detect a radial component of motion having an amplitude proportional to the cylinder rotation rate. In the gyroscope 2 of FIGS. 1 to 3, the AC output signal from the transducers C, C' is rectified with a phase-sensitive rectifier using the drive signal as a reference. This enables a DC signal to be produced which is proportional to the rotation rate of the cylinder 4.

Due to a relatively low internal mechanical damping of the cylinder 4,the decay of the vibration generated by the Coriolis force is slow. Thus, in order to ensure that the gyroscope 2 can respond to rapid changes of cylinder rotation rate, external damping means is incorporated in the form of further transducers D, D'. These transducers D, D' are located at the second pair of nodes 16, 20 (see FIG. 3) and are used to apply a negative feedback to oppose the component of cylinder vibration produced by rotation. This is achieved by amplifying the rotation dependent output from transducers C and C' and applying this signal to transducers D and D' with the phase shift necessary to produce driving forces opposing the vibration generated by the cylinder rotation can be adjusted.

Vibratory gyroscopes such as the cylinder gyroscopes 2 described above have advantages over traditional rotary gyroscopes in that they are more convenient to construct and generally far more robust. However, the accuracy of vibratory gyroscopes is less than that of rotary gyroscopes and is not acceptable for use in inertial navigation systems.

SUMMARY OF THE INVENTION

It is an object of the present invention to provide a vibratory gyroscope having improved accuracy.

A first aspect of the present invention provides a vibratory gyroscope that includes: a vibratory element; means for inducing a mode of vibration into the vibratory element, the inducing means including an acoustic signal source provided at a location spaced from the vibratory element; means for detecting strain in the vibratory element; processing means for generating, in response to a change in strain detected in the vibratory element, a signal indicative of a rate of rotation about an axis of the vibratory element corresponding to a rotation imparted to the vibratory element subsequent to an inducing of the vibration; and dampening means for reducing to zero the change in strain. The dampening means including an acoustic signal source.

The acoustic signal source of said dampening means may be provided at a location spaced from the vibratory element.

Preferably, the means for detecting strain includes a Surface Acoustic Wave (SAW) device mounted to the vibratory element and in electrical communication with the processing means by a capacitive or inductive couple.

Alternatively, the means for detecting strain may include a first capacitor plate mounted to a portion of the vibratory element which moves, during vibration of the element, relative to a fixture, and may also include a second capacitor plate mounted to the fixture adjacent the first capacitor plate.

It is possible to measure this displacement by optical methods, such as by interferometry using a laser. A second aspect of the present invention provides a vibratory gyroscope that includes a vibratory element; means for inducing a mode of vibration into the vibratory element; means for detecting strain in the vibratory element; and processing means for generating, in response to a change in strain detected in the vibratory element, a signal indicative of a rate of rotation about an axis of the vibratory element corresponding to a rotation imparted to the vibratory element subsequent to an inducing of the vibration. The means for detecting strain includes a Surface Acoustic Wave (SAW) device mounted to the vibratory element and in electrical communication with the processing means by a capacitive or inductive couple.

Preferably, the means for inducing a mode of vibration includes an acoustic signal source provided at a location spaced from the vibratory element.

A third aspect of the present invention provides a vibratory gyroscope that includes a vibratory element; means for inducing a mode of vibration into the vibratory element; means for detecting strain in the vibratory element; and processing means for generating, in response to a change in strain detected in the vibratory element, a signal indicative of a rate of rotation about an axis of the vibratory element corresponding to a rotationimparted to the vibratory element subsequent to an inducing of the vibration. The means for detecting strain includes a first capacitor plate mounted to a portion of the vibratory element which moves, during vibration of the element, relative to a fixture. The means for detecting strain further comprising a second capacitor plate mounted to the fixture adjacent the first capacitor plate.

The position of the vibratory clement can be determined by optical methods, if the surface of the element is made reflective to light (FIG. 11).

Preferably, the means for inducing a mode of vibration includes an acoustic signal source provided at a location spaced from the vibratory element.

Thus, a vibratory gyroscope according to the aforementioned aspects of the present invention includes a vibratory element that may be induced with a mode of vibration. Strain in the vibratory element as a consequence of the induced vibration may be detected by the strain detecting means. Once a mode of vibration has been induced, a subsequent rotation of the vibratory element will cause a displacement of the strain pattern relative to the vibratory element and, accordingly, relative to the strain detecting means. This displacement in strain pattern is a consequence of the well-known Coriolis effect. A given rate of rotation will give rise to a given displacement of strain pattern and, as a result, give rise to the detection of a given change in detected strain. The processing means of the present invention may therefore indicate, by reference to the detected strain, the rate of rotation of vibratory element.

In order to limit physical contact with the vibratory element, the means for inducing a mode of vibration is located at a position remote from the vibratory element and communicates vibratory energy by means of an acoustic signal.

Where the means for detecting strain includes first and second capacitor plates, it will be understood that these plates are spaced from one another with capacitive effect being provided by the dielectric characteristics of the fluid (preferably nitrogen gas) located there between. Prior to induced vibration of the vibratory element, the element remains stationary relative to the fixture. The space between the two capacitor plates therefore remains constant with the result that the capacitance remains constant. However, once vibration is induced, the vibratory element moves cyclically towards and away from the fixture. Accordingly, the space between the two capacitor plates varies with the consequence that capacitance also varies. If the vibratory element is rotated, then the cyclical movement of the vibratory element relative to the fixture will change as a result of Coriolis forces. This change in movement (corresponding to the aforementioned change in the strain) allows the processing means to determine the rate of rotation.

BRIEF DESCRIPTION OF THE DRAWINGS

Embodiments of the present invention will now be described with reference to the accompanying drawings, in which.

DETAILED DESCRIPTION OF PREFERRED EMBODIMENTS

Figure 1:
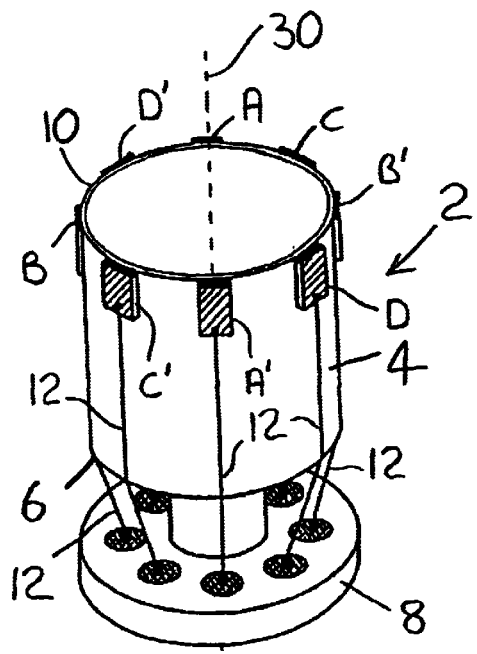
FIG. 1 is a schematic perspective view of a prior art cylinder vibratory gyroscope.
Figure 2:
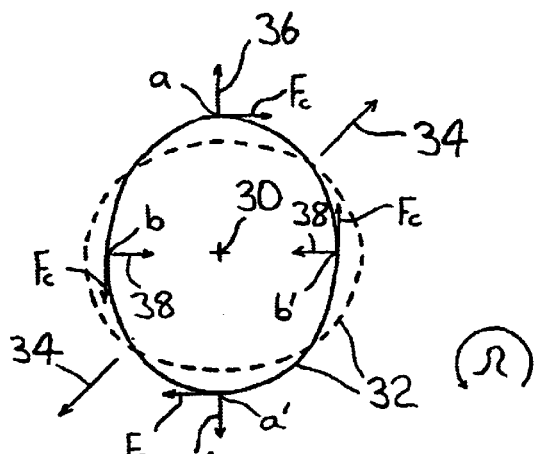
FIG. 2 is a force diagram showing a plan view of the gyroscope shown in FIG. 1.
Figure 3:
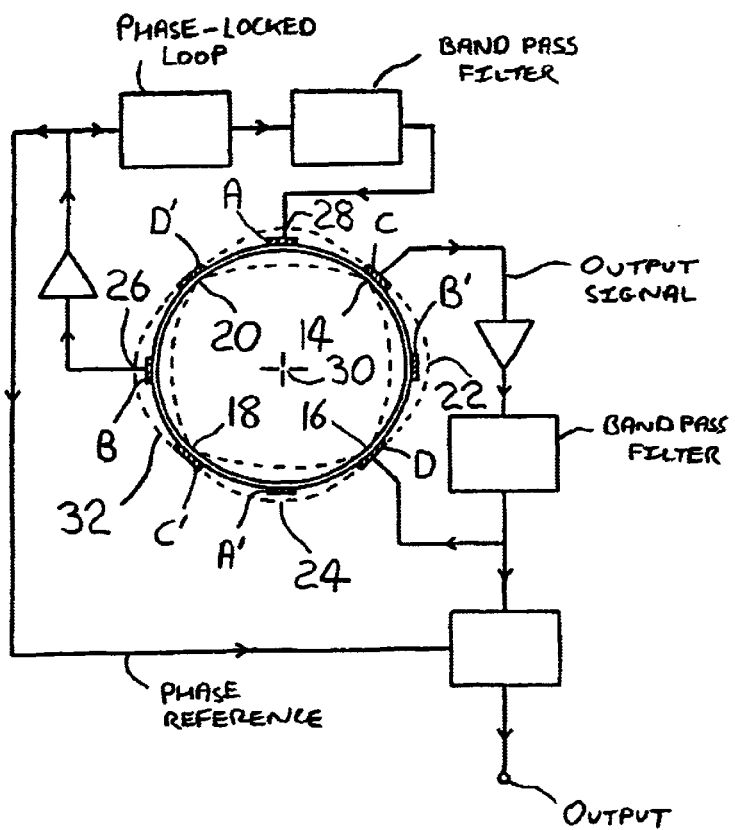
FIG. 3 is a schematic plan view of the gyroscope shown in FIG. 1 together with a block diagram of associated electronic control circuitry.
Figure 6:
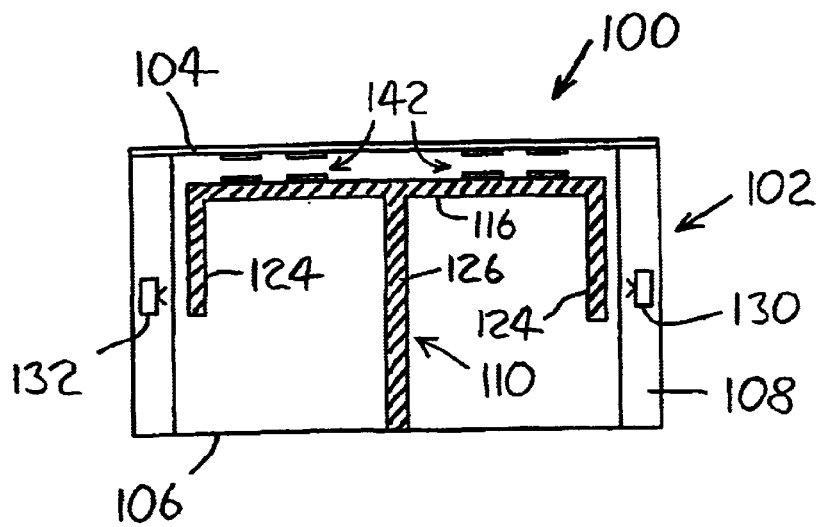
FIG. 6 is a cross-sectional side view of a cylinder vibratory gyroscope, according to an illustrative embodiment of the present invention.

A cylinder vibratory gyroscope 100 according to the present invention is shown in the cross-sectional view of FIG. 6. The gyroscope 100 comprises a frame member 102 having two circular discs 104, 106 closing the open ends of a cylinder wall 108. The frame member 102 corresponds to the pedestal 8 of the prior art gyroscope 2 shown in FIGS. 1 to 3 and, accordingly, is employed as a base to which the vibratory element 110 is mounted.

Figure 4:
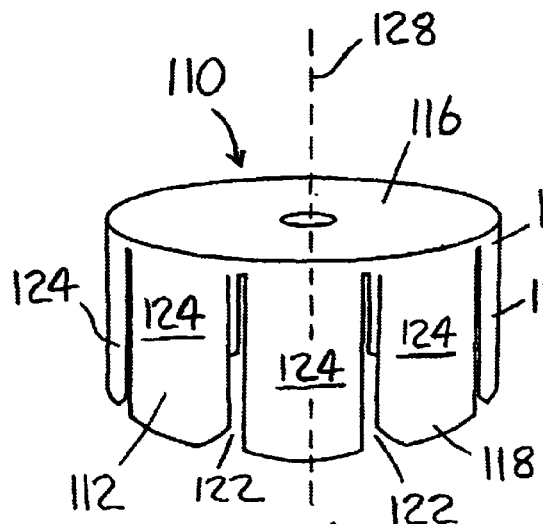
FIG. 4 is a schematic perspective top view of a vibratory element, according to an illustrative embodiment of the present invention.
Figure 5:
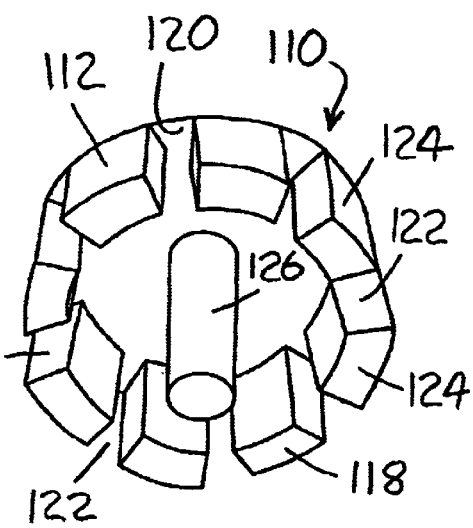
FIG. 5 is a schematic perspective bottom view of the vibratory element shown in FIG. 4.

Top and bottom perspective views of the vibratory element 110 are shown in FIGS. 4 and 5. It will be seen that the vibratory element 110 comprises a cylindrical wall 112 which has one end 114 closed by means of a circular planar wall 116. The end 118 of the cylindrical wall 112 opposite the closed end 114 is open and therefore able to freely vibrate. In this respect, the vibratory element 110 is similar to the cylinder 4 of the prior art gyroscope 2.

The cylindrical wall 112 is provided with a number of elongate slots extending through the full thickness of the wall 112 and extending from the underside 120 of the planar wall 116 longitudinally along the length of the cylindrical wall 112 to the free end 118 of the cylindrical wall 112. In the embodiment shown, a total of eight slots 122 are provided. The slots 122 are equallyspaced about the circumference of the cylindrical wall 112 and result in the formation of eight identical elongate fingers 124 depending from the planar wall 116. The provision of the elongate fingers 124, rather than a continuous and unbroken cylindrical wall, reduces the stiffness of the vibratory element 110 and allows greater movement of vibration at the free end 118 and increased strain in the planar wall 116. An increased strain in the planar wall 116 is beneficial in the present embodiment since it is these strains in the present embodiment that are detected in order to determine the Coriolis effect.

As can be seen most clearly from FIG. 5, a solid elongate cylindrical mounting member 126 extends longitudinally along the axis 128 of the vibratory element 110 from the underside 120 of the planar wall 116. The end of the mounting member 126 distal from the planar wall 116 is secured firmly to the lower circular disc 106 of the frame member 102 (see FIG. 6). As can be seen from FIG. 6 in particular, the length of the mounting member 126 is greater than that of the elongate fingers 124 so that, when the vibratory element 110 is mounted in the frame member 102, the free ends 118 of the elongate fingers 124 are spaced from the lower circular disc 106. It will be understood with reference to the following description that the only contact made by the vibratory element 110 with the surrounding frame member 102 is at the juncture of the mounting member 126 with the lower circular disc 106.

Figure 7:
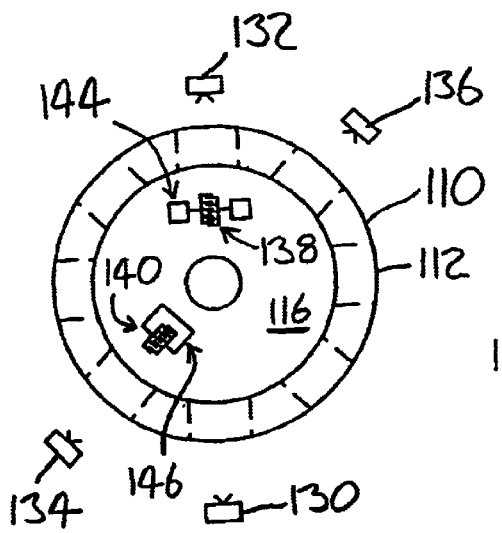
FIG. 7 is a schematic plan view of the vibratory element together with SAW detectors and acoustic source devices.

With reference to FIGS. 6 and 7, it will be seen that the cylinder wall 108 of the frame member 102 houses four acoustic sources 130, 132, 134, 136 (two of which are not visible in FIG. 6). The outer diameter of the cylinder wall 112 of the vibratory element 110 is marginally less than the inner diameter of the cylinder wall 108 of the frame member 102. Accordingly, the acoustic sources 130 to 136 may be located in close proximity to the free ends of elongate fingers 124. As can be seen from FIG. 7, one pair of acoustic sources 130, 132 is located adjacent two diametrically opposed fingers 124. In use, these two acoustic sources 130, 132 generate acoustic signals to drive a constant vibration in the vibratory element 110 at said element's resonant frequency. In tested vibratory elements (having the configuration shown in FIGS. 4 and 5 and an outer diameter of 30 mm with an elongate finger length of 15 mm) the resonant frequency has been approximately 2 kHz. The two driving acoustic sources 130, 132 correspond to the two driving transducers A, A' of the prior art gyroscope 2 shown in FIGS. 1 to 3. It will be noted however that the acoustic sources 130, 132 of the gyroscope 100 are able to induce vibration without physical contact with the vibratory element 110.

With reference to FIG. 7, it will be seen that the planar wall 116 of the vibratory element 110 is provided with a SAW device 138 for measuring strain, in a radial direction, within said planar wall 116. It will be understood that the SAW device 138 is aligned with a radial located on an antinode of vibration and, accordingly, provides feedback as to the vibratory element 110 response to the drive signal. This feedback may be used to stabilize vibration at the resonance frequency. The use of SAW (Surface Acoustic Wave) devices for the measurement of strain will be readily understood by those skilled in the art.

The second pair of acoustic sources 134, 136 are located adjacent diametrically opposite sides of the cylindrical wall 112 of the vibratory element 110 and are offset relative to the first pair of acoustic sources 130, 132 by an angle of 45° (see FIG. 7). A second SAW device 140 is provided on the planar wall 116 along a radial extending between said second pair of acoustic sources 134, 136. As with the first SAW device 138, the second SAW device 140 is orientated so as to detect strain within the planar wall 116 in a radial direction. It will be understood that the radial upon which the second SAW device 140 is located passes through a node of vibration. As such, the second SAW device 140 may be considered as corresponding to the transducers C, C' of the prior art gyroscope 2 and, accordingly, may be employed to detect the Coriolis effect generated during a rotation of the gyroscope 100.

In use of the gyroscope 100, the first SAW device 138 will, whilst the gyroscope 100 remains stationary, detect effectively zero strain. This is because the second SAW device 140 is located along a nodal radial. However, when gyroscope 100 is rotated about its axis 30, the nodal radial becomes displaced and strain in the planar wall 116 will be detected by the second SAW device 140. As previously explained, this strain is a consequence of the Coriolis effect.

In order for the gyroscope 100 to respond rapidly to changes in angular velocity, the rotation-induced vibration along the radial of the second SAW device 140 may be reduced to zero by applying a negative feedback acoustic signal via the second pair of acoustic sources 134, 136. The magnitude of this "correction"signal is proportional to the rate of rotation of the structure and may provide the rate output required for gyroscope applications.

As will be understood by those skilled in the art, the two SAW devices 138, 140 may be interrogated without the need for direct electrical connection thereto. Interrogation of the SAW devices may be achieved by suitable means 142 employing capacitive (as shown by the squares 144 in FIG. 7) or inductive (as shown by the loop 146 in FIG. 7) methods. The two SAW devices 138, 140 may be interrogated by the same method or one device may be interrogated by capacitive means whilst the other devices are interrogated by inductive means.

Strain in the planar wall 116 may be detected in a tangential direction rather than a radial direction as discussed in relation to FIG. 7. Accordingly, the two SAW devices 138,140 shown in FIG. 7 may be rotated through 90° so as to adopt the alternative orientation shown in FIG. 8.

In a further embodiment, the two SAW devices 138, 140 may be omitted and their measurements made by reference to a change in capacitance resulting from the variation in the spacing between the outer diameter of the cylindrical wall 112 of the vibratory element 110 and the inner diameter of the cylinder wall 108 of the frame member 102. The aforementioned spacing 148 varies due to the radial movement of the vibratory element 110 as it vibrates relative to the frame member 102. Capacitive plates 150, 152 are provided as metallized strips on the inner and outer diameter surfaces of the cylinder wall 108 and cylindrical wall 112 respectively. The plates 150, 152 are located at the free end of the cylindrical wall 112 so as to ensure that maximum radial displacement (and maximum variation in capacitance) is measured.

Figure 8:
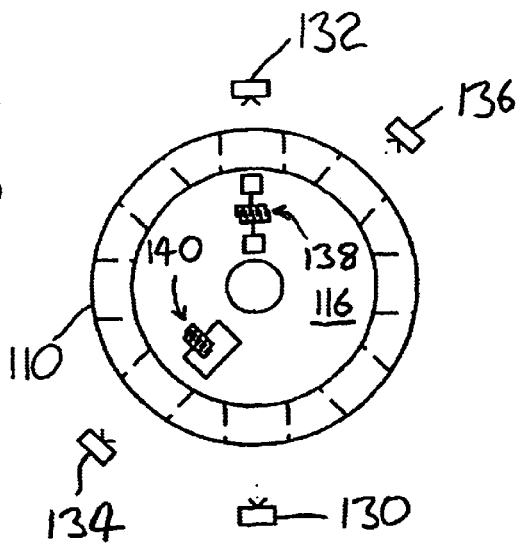
FIG. 8 is a schematic plan view of the vibratory element together with acoustic source devices and an alternative arrangement of SAW detectors.
Figure 9:
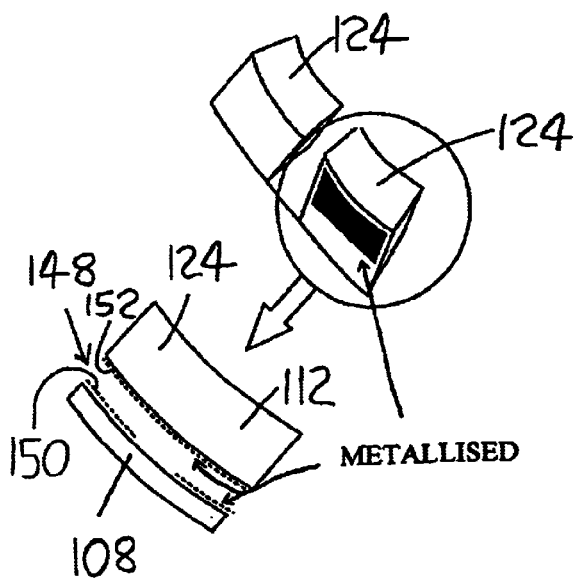
FIG. 9 is a schematic perspective view of portions of the vibratory element and surrounding frame of an alternative embodiment wherein said element and frame have been metallized so as to allow capacitive measurement of vibratory displacement.
Figure 11:
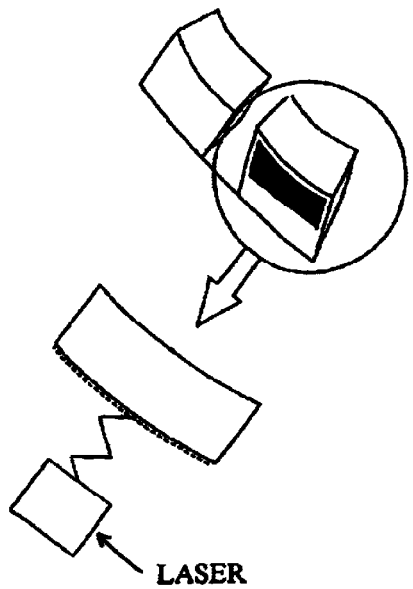
FIG. 11 is a schematic perspective view of portions of the vibratory element utilizing a laser for measuring displacement.

In the gyroscope 100 shown in FIG. 6, and also in the gyroscopes having the alternative arrangements shown in FIGS. 8 and 9, the frame member 102 is sealed and filled with nitrogen, rather than air, so as to reduce corrosion and moisture levels.

Figure 10:
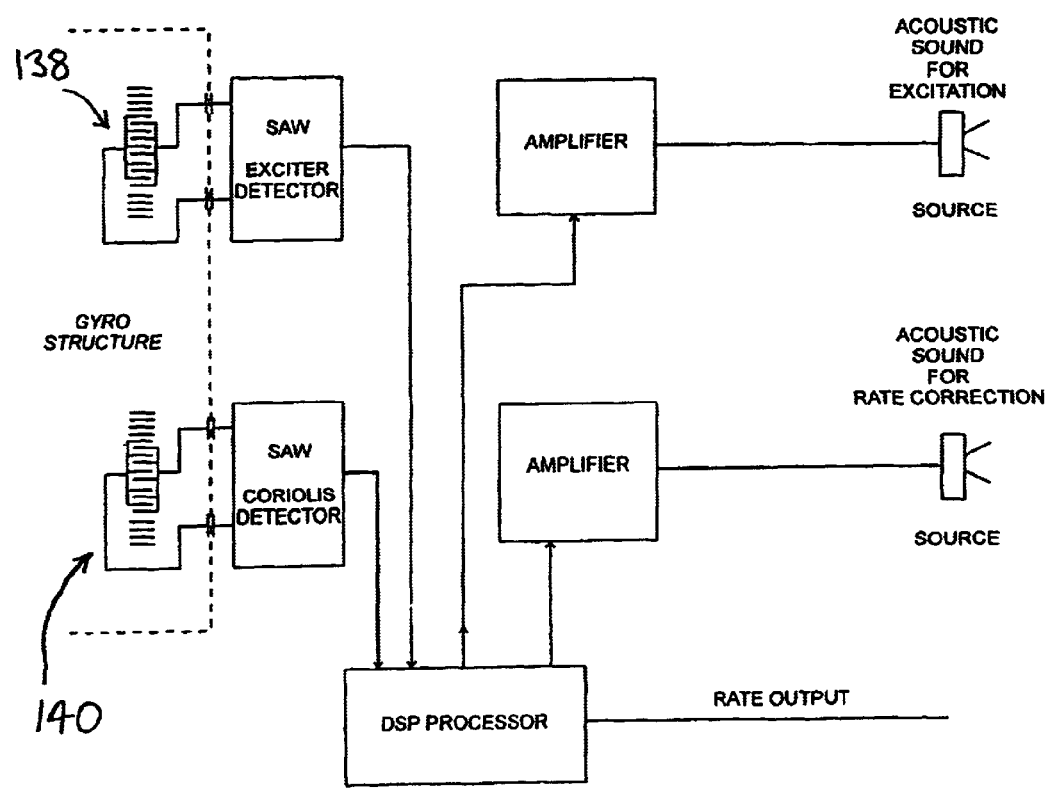
FIG. 10 is a schematic block diagram of electronic control circuitry associated with the SAW detectors and acoustic source devices of the first embodiment.

The acoustic sources 130, 132, 134, 136, together with appropriate electronic control circuitry (as schematically shown in FIG. 10) for these sources and the SAW devices, are securely mounted within the frame member 102.

It will be appreciated that the performance of a vibratory gyroscope is critically dependent upon the extent to which the vibrating structure departs from the ideal axis of symmetry. Any department from axial symmetry due, for example, to the effect of the mass of sensors or vibration actuators mounted to the vibrating structure (or any connecting wires) will give rise to two undesirable consequences. These consequences are (i) frequency splitting, which decreases the sensitivity of the gyroscope; and (ii) "mode-fixing", which can cause misalignment between the drive pick-off devices and the point of maximum vibration amplitude and, as a result, again give rise to a decrease in sensitivity. These undesirable effects are avoided in the aforementioned embodiments by reducing the masses secured to the vibrating structure and limiting direct physical contact with said structure.

The present invention is not limited to the specific embodiments described above. Alternative arrangements will be apparent to a reader skilled in the art. For example, the vibratory element may be a hemisphere or ring, or another normally axisymmetric shape. Also, the vibratory element may be driven in a mode other than its primary mode of vibration. For such drive modes, the sensors for detecting the Coriolis effect and the actuators for cancelling the Coriolis effect will be orientated at an angle other than 45° to the drive direction.

What is claimed is:

1. A vibratory gyroscope, comprising:
   a vibratory element;
   means for inducing a mode of vibration into said vibratory element, said inducing means including an acoustic signal source provided at a location spaced from said vibratory element;
   means for detecting strain in said vibratory element;
   processing means for generating, in response to a change in strain detected in said vibratory element, a signal indicative of a rate of rotation about an axis of said vibratory element corresponding to a rotation imparted to said vibratory element subsequent to an inducing of said vibration; and
   dampening means for reducing to zero said change in strain, said dampening means including an acoustic signal source.

2. The vibratory gyroscope as claimed in claim 1, wherein the acoustic signal source of said dampening means is provided at a location spaced from said vibratory element.

3. The vibratory gyroscope as claimed in claim 1, wherein said means for detecting strain comprises a Surface Acoustic Wave (SAW) device mounted to said vibratory element and in electrical communication with said processing means by a capacitive or inductive couple.

4. The vibratory gyroscope as claimed in claim 1, wherein said means for detecting strain comprises:
   a first capacitor plate mounted to a portion of said vibratory element which moves, during vibration of said element, relative to a fixture; and
   a second capacitor plate mounted to said fixture adjacent the first capacitor plate.

5. The vibratory gyroscope as claimed in claim 1, wherein said means for detecting strain comprises an interferometer that, in turn, includes means for reflecting light from a portion of said vibratory element which moves, during vibration of said element, relative to a fixture.

6. The vibratory gyroscope as claimed in claim 5, wherein said interferometer comprises a laser.

7. A vibratory gyroscope, comprising:
   a vibratory element;
   means for inducing a mode of vibration into said vibratory element, wherein said means for inducing a mode of vibration comprises an acoustic signal source provided at a location spaced from said vibratory element;
   means for detecting strain in said vibratory element; and
   processing means for generating, in response to a change in strain detected in said vibratory element, a signal indicative of a rate of rotation about an axis of said vibratory element corresponding to a rotation imparted to said vibratory element subsequent to an inducing of said vibration,
   wherein said means for detecting strain comprises a Surface Acoustic Wave (SAW) device mounted to said vibratory element and in electrical communication with said processing means by a capacitive or inductive couple.

8. A vibratory gyroscope, comprising:
   a vibratory element;
   means for inducing a mode of vibration into said vibratory element, wherein said means for inducing a mode of vibration comprises an acoustic signal source provided at a location spaced from said vibratory element;
   means for detecting strain in said vibratory element; and
   processing means for generating, in response to a change in strain detected in said vibratory element, a signal indicative of a rate of rotation about an axis of said vibratory element corresponding to a rotation imparted to said vibratory element subsequent to an inducing of said vibration, wherein said means for detecting strain comprises:
  a first capacitor plate mounted to a portion of said vibratory element which moves, during vibration of said element, relative to a fixture; and
  a second capacitor plate mounted to said fixture adjacent the first capacitor plate.

9. A vibratory gyroscope, comprising:

a vibratory element;

means for inducing a mode of vibration into said vibratory element, wherein said means for inducing a mode of vibration comprises an acoustic signal source provided at a location spaced from said vibratory element;

means for detecting strain in said vibratory element; and processing means for generating, in response to a change in strain detected in said vibratory element, a signal indicative of a rate of rotation about an axis of said vibratory element corresponding to a rotation imparted to said vibratory element subsequent to an inducing of said vibration, and wherein said means for detecting strain comprises an interferometer that, in turn, includes means for reflecting light from a portion of said vibratory element which moves, during vibration of said element, relative to a fixture.

10. The vibratory gyroscope as claimed in claim 9, wherein said interferometer comprises a laser.

11. The vibratory gyroscope as claimed in claim 2, wherein said means for detecting strain comprises a Surface Acoustic Wave (SAW) device mounted to said vibratory element and in electrical communication with said processing means by a capacitive or inductive couple.

12. The vibratory gyroscope as claimed in claim 2, wherein said means for detecting strain comprises:
  a first capacitor plate mounted to a portion of said vibratory element which moves, during vibration of said element, relative to a fixture; and
  a second capacitor plate mounted to said fixture adjacent the first capacitor plate.

13. The vibratory gyroscope as claimed in claim 2, wherein said means for detecting strain comprises an interferometer that, in turn, includes means for reflecting light from a portion of said vibratory element which moves, during vibration of said element, relative to a fixture.

14. The vibratory gyroscope as claimed in claim 13, wherein said interferometer comprises a laser.

* * * * *